United States Patent
Becker et al.

(10) Patent No.: US 8,782,070 B2
(45) Date of Patent: Jul. 15, 2014

(54) DATA PATTERN FOR STORING INFORMATION, INCLUDING ASSOCIATED VERSION AND AUDIT INFORMATION FOR USE IN DATA MANAGEMENT

(75) Inventors: Laurence W. Becker, Mountain View, CA (US); Mark Kleidon, Livermore, CA (US); Brent Thomas Jenkins, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/572,890

(22) Filed: Aug. 13, 2012

(65) Prior Publication Data

US 2013/0179482 A1 Jul. 11, 2013

Related U.S. Application Data

(63) Continuation of application No. 12/139,327, filed on Jun. 13, 2008, now Pat. No. 8,244,716.

(51) Int. Cl.
*G06F 17/30* (2006.01)

(52) U.S. Cl.
USPC .................................. 707/759; 707/765

(58) Field of Classification Search
None
See application file for complete search history.

(56) References Cited

U.S. PATENT DOCUMENTS

2002/0048369 A1* 4/2002 Ginter et al. ............ 380/277
2005/0209876 A1* 9/2005 Kennis et al. ............... 705/1

* cited by examiner

*Primary Examiner* — Wilson Lee
(74) *Attorney, Agent, or Firm* — Campbell Stephenson LLP

(57) ABSTRACT

Information is stored in a data pattern. The data pattern includes an identity table, a version table that includes at least one reference to the identity table, and an audit table that includes at least one reference to the version table. The identity table stores information identifying the information. The version table stores version information identifying one or more versions of the information identified in the identity table. The audit table stores audit information identifying when each of the one or more versions of the information was modified. The audit table may also store effectiveness information identifying when each of the one or more versions of the information is in effect.

18 Claims, 12 Drawing Sheets

DATA PATTERN FOR STORING INFORMATION, INCLUDING ASSOCIATED VERSION AND AUDIT INFORMATION FOR USE IN DATA MANAGEMENT

CROSS-REFERENCE TO RELATED APPLICATIONS

This application is a continuation of U.S. patent application Ser. No. 12/139,327, entitled "DATA PATTERN FOR STORING INFORMATION, INCLUDING ASSOCIATED VERSION AND AUDIT INFORMATION FOR USE IN DATA MANAGEMENT", filed Jun. 13, 2008, and issuing on Aug. 14, 2012, as U.S. Pat. No. 8,244,716, naming Laurence W. Becker, Mark Kleidon, and Brent Thomas Jenkins as inventors. This application is assigned to Oracle International Corporation, the assignee of the present invention, and is hereby incorporated by reference, in its entirety and for all purposes.

FIELD OF THE INVENTION

This invention relates to data management and, more particularly, to a data pattern for managing information.

BACKGROUND

Various data processing systems, such as customer relationship management systems, use several types of information. Two such types of information are reference information and transactional information. Transactional information identifies a particular transaction (e.g., such as an order placed by a customer). Transactional information contains references to reference information, which identifies various entities (e.g., such as products and customers) that are affected by or involved in the transaction identified by the transactional information.

Reference information can be modified over time. For example, a computer retailer may update the reference information describing a particular software product as new releases of that software become available. Similarly, if a customer changes her name or contact information, a retailer can update the reference information for that customer to identify the customer's new name and/or contact information.

Reference information can also be designed to expire or otherwise become ineffective over time. For example, a retailer may specify a seasonal sale price for a product, where the seasonal sale price is only effective for a limited time. Similarly, a contract employee may be employed for a limited time, which can be reflected by the reference information for that employee specifying a particular effectiveness period bounded by the employee's beginning and ending dates of employment.

Because of the variable nature of reference information over time, many data processing systems support functions to recreate the particular state of a particular entity described by the reference information at a specific point in time. For example, some systems provide a function such as auditing, which provides a user with information identifying how a particular entity described by reference information has been modified over time. Other functions can show the various time periods during which a particular entity described by the reference information was effective. Similar functions can be used to change reference information to a state that existed at another time (e.g., such as an "undo" or "redo" function or a "restore" function).

Currently, various data patterns are available to store information included within and/or associated with reference information. Typically, a different data pattern is used to store information for each specific function to be performed on the reference information. Thus, the same reference information may be represented by many different data patterns, each of which is only used to perform a single function. Unfortunately, maintaining the same reference information in multiple data patterns leads to confusion, inefficiency, and/or inconsistency. Accordingly, new techniques for maintaining reference information are desirable. Such techniques are also desirable for maintaining transactional information.

SUMMARY OF THE INVENTION

Various systems and methods are disclosed for maintaining a data pattern for storing reference or transactional information, including associated version and audit information. In one embodiment, a method involves storing information in a data pattern, and then accessing that information. The data pattern includes an identity table, a version table that includes at least one reference to the identity table (e.g., the version table can include multiple references back to the identity table), and an audit table that includes at least one reference to the version table (e.g., the audit table can include multiple references back to the version table). The identity table stores information identifying the information. The version table stores version information identifying one or more versions of the information identified in the identity table. The audit table stores information identifying when each of the one or more versions of the information was modified. The audit table can also store effectiveness information identifying when each of the one or more versions of the information is effective.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1A:
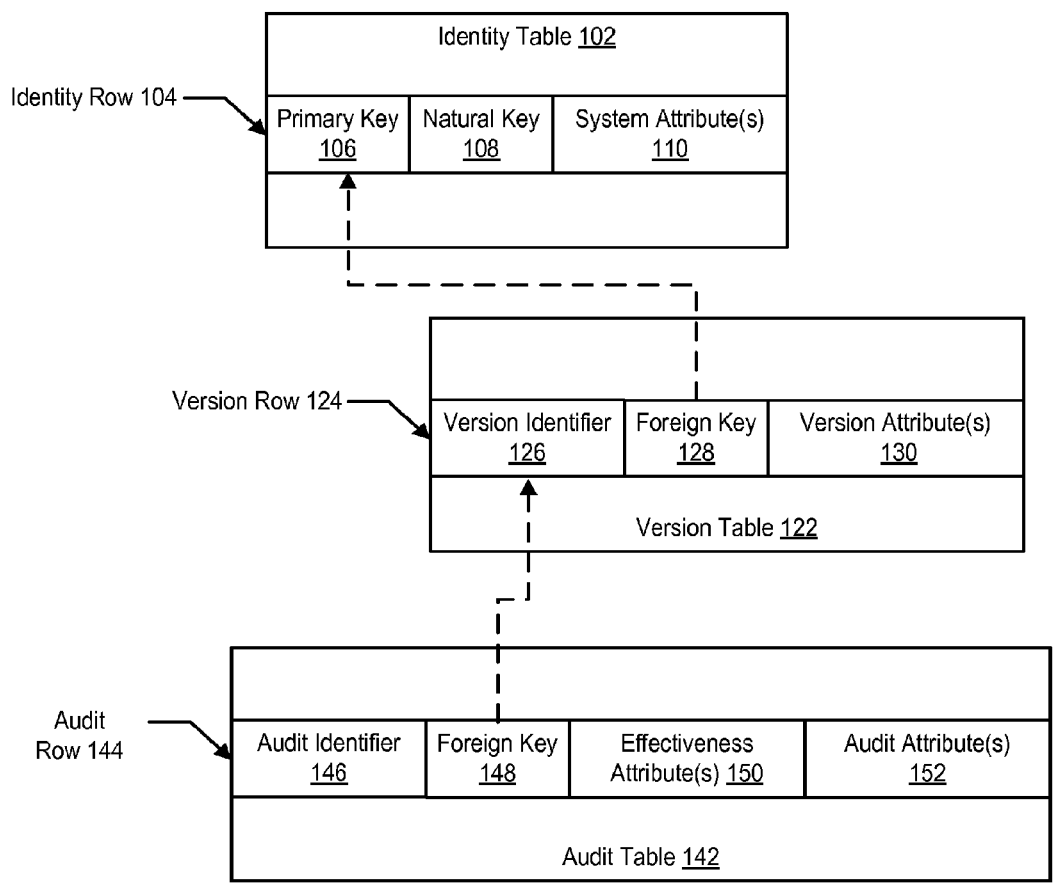
FIG. 1A is a block diagram of a set of tables organized according to a data pattern for storing information, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1A illustrates a data pattern usable to store information. As used herein, a data pattern is a data structure that is organized to store information (e.g., reference information, repository information, or transactional information) and associated metadata. Reference information is information that describes an entity (e.g., a product, employee, customer, service, or the like) that is affected by or involved in the performance of a transaction, which can in turn be described by transactional information. Repository information can be referenced by reference and/or transactional information.

As shown in FIG. 1A, the data pattern for storing information includes a set of three tables (such tables can also be referred to as databases): an identity table 102, a version table 122, and an audit table 142. These tables can be implemented using database software (e.g., a relational database management system such as Oracle™ Database, provided by Oracle Corporation of Redwood Shores, Calif.).

Identity table 102 includes one or more rows 104 (such rows can also be referred to as records). In one embodiment, a separate identity table is maintained for each type of entity for which information is maintained. Examples of types of entities that can be identified in an identity table include employees, customers, products, territories, territory nodes, companies, and the like. Each row 104 in identity table 102 represents an instance of the entity represented by the identity table. For example, a row in an "Employee" identity table can identify a particular employee.

Identity row 104 includes a primary key 106, which uniquely identifies the particular instance associated with the row. Primary key 106 is a one column identifier (columns can also be referred to as fields) that references a natural key (or several such natural keys, if available) within the row. A one column primary key identifier is also referred to as a surrogate primary key.

In some alternative embodiments, primary key 106 is implicit (instead of being an explicit column as shown in FIG. 1A). For example, primary key 106 can be the absolute or relative position of identity row 104 within identity table 102, a sequence number or timestamp associated with identity row 104 (e.g., identifying the relative order or time at which identity row 104 was added to identity table 102), or other information unique to identity row 104 but not necessarily included within identity row 104.

Identity row 104 also includes a natural key 108. Natural key 108 can include one or more columns within identity row 104 that store user keys and/or unique identifiers that define ownership of the particular instance described by identity row 104. In one embodiment, primary key 106 references the natural key 108.

Identity row 104 can also include system attributes 110 associated with the entity. For example, one system attribute can indicate whether all or some of the information describing the instance has been archived. Similarly, another system attribute can indicate whether all or some of the reference information is system information. Yet another system attribute can describe whether all or some of the information has been locked to prevent unauthorized modification. System attributes can also indicate whether the information is linked to other independent information or whether the information is federated information.

In this example, none of the information contained in identity row 104 is versioned information. In other words, all of the information in identity row 104 is information that is not versioned over time. Accordingly, if the system attributes 110 associated with identify row 104 are modified, these changes are not tracked, nor are these changes auditable. Once created, identity row 104 will not be deleted, even if the information (e.g., stored in the version and audit tables described below) associated with identity row 104 is modified (or even deleted).

Version table 122 stores information representing one or more versions of an instance of an entity. Each version row 124 within version table 122 stores information representing one particular version of an instance of an entity.

As shown in FIG. 1A, version row 124 includes a version identifier 126 (e.g., a single column primary key for version row 124, which can also be referred to as a surrogate primary key for version row 124) that uniquely identifies version row 124 within version table 122. Version row 124 also includes a foreign key 128 that refers to the appropriate surrogate primary key in identity table 102. In this example, foreign key 128 of version row 124 refers to primary key 106 of identity row 104 (e.g., this can be effected by setting the value of foreign key 128 to equal the value of primary key 106). This indicates that version row 124 stores information describing a version of the instance of the entity identified by identity row 104.

Thus, the foreign keys in version table 122 allow each version row to be linked to a particular identity row. Similarly, all of the rows of version table 122 that are associated with the same instance of an entity can be identified by simply searching version table 122 for all rows having foreign keys that identify the primary key of the identity row for that instance of the entity.

Each time an instance of an entity is modified, a new version row 124 is created in version table 122. Thus, multiple version rows can be associated with the same instance of the entity, such that multiple version rows have the same value of foreign key 128. Individual version rows can be distinguished by their respective version identifier 126.

Version row 124 also stores one or more version attributes 130. Each version attribute can be stored in a separate column. Each version attribute 130 is an item of information (e.g., such as a name, address, description, stock symbol, and the like) that can be versioned over time. For each version attribute 130, version row 124 can store an attribute name and an attribute value. It is noted that some version attributes can be references to other sets of information (e.g., a version attribute of an employee record can reference a company record). Thus, the value of some version attributes can be foreign keys that have values equal to the primary keys of identity rows of other records, as shown in FIG. 11.

Figure 11:
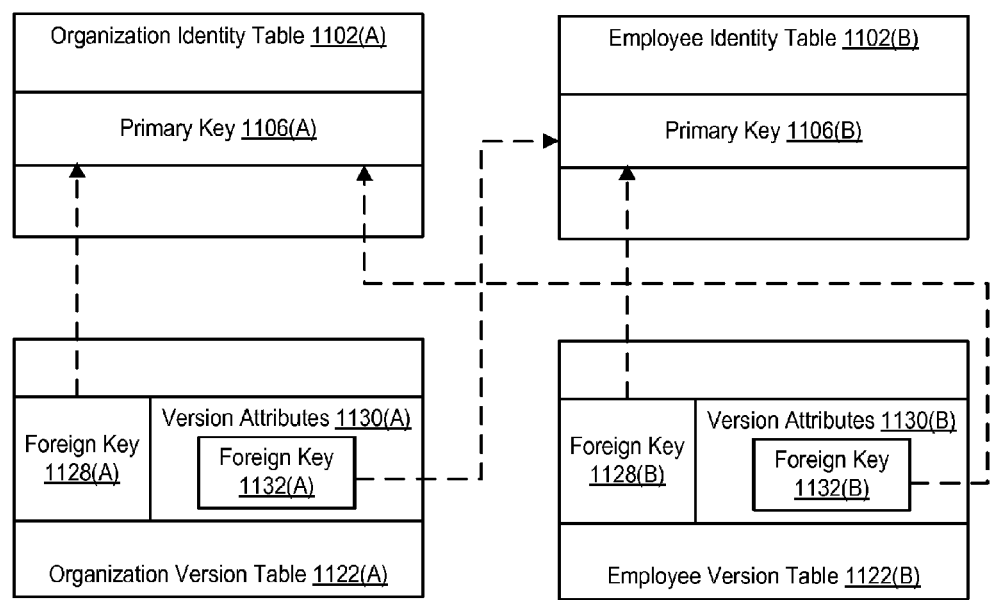
FIG. 11 shows two data patterns, each of which stores information representing a different entity in the data pattern of FIG. 1A, according to one embodiment of the invention.

FIG. 11 shows two data patterns, each of which stores information representing a different entity in the data pattern of FIG. 1A (for simplicity, the audit tables are omitted from this view). An organization is described by information stored in a row of an organization identity table 1102(A). This row includes the primary key 1106(A) that identifies a particular organization. An organization version table 1122(A) includes one or more organization version rows that correspond to the organization. Each organization version row includes a foreign key 1128(A) that references the primary key of the organization's identity row. Each organization version row also includes one or more version attributes 1130(A). Such attributes can include foreign keys, such as foreign key 1132(A), that can reference records describing specific employees of the organization (e.g., a manager within the organization). Thus, foreign key 1132(A) references the primary key 1106(B) of a row in an employee identity table 1102(B).

Similarly, the employee's attributes can include foreign keys that refer to other entities. In this example, the employee version table 1122(B) includes an employee version row that includes foreign key 1128(B), which references primary key 1106(B) of the employee's identity row. The row in employee version table 1122(B) also includes version attributes 1130(B), which include foreign key 1132(B), which references the primary key used to identify the organization's identity row in organization identity table 1102(A). Thus, foreign key 1132(B) indicates that the employee is an employee of the organization.

Returning to FIG. 1A, it is noted that version row 124 does not include attributes that define audit times (e.g., the time at which the version was created) or effectivity periods (e.g., times at which the version is no longer effective). Instead, this information is maintained in audit table 142, as described below.

While a version row does not store temporal attributes that define audit times and effectivity periods, the version row can store temporal information. For example, the version attributes can include attributes such as "Date of Birth," "Date of Death," "Hiring Date," and the like.

In at least some embodiments, existing versions are not modified or permanently discarded, even though those versions may currently be ineffective. In other words, version rows are not deleted from version table 122 over time (however, version rows can be archived, as described in more detail below). Accordingly, the data pattern can be described as non-destructive, since no information about preexisting versions is ever lost. The non-destructive nature of the data pattern can be used to, among other things, provide a non-destructive record of all versions of a particular instance of a particular entity that ever existed, as well as to allow a user to roll back all changes that have ever been made to a particular item of information.

Audit table 142 is a table that stores information (referred to herein as effectiveness information) representing when particular versions of an instance of an entity are effective, as well as information (referred to herein as audit information) indicating when each version was modified. Modifications are identified as the creation (i.e., activation) of a new version and/or the deletion (i.e., deactivation) of a prior version, if any. For example, if a user requests to modify a version attribute of an entity, an existing version row, storing the original value of the version attribute, will be deactivated, and a new version row, storing the modified value of the version attribute, will be activated. In general, modifications can involve the creation of a new entity, which involves activating a version row, and/or the modification of an existing entity, which involves deactivating one or more version rows and activating one or more version rows.

Each row in audit table 142 is associated with a row in version table 122. Accordingly, each row in audit table 142 identifies when a particular version is effective and was modified.

Each audit row 144 includes an audit identifier 146, which is a single column primary key (also referred to herein as a surrogate primary key) that uniquely identifies an audit row 144 within audit table 142. Each audit row 144 also includes a foreign key 148, which references a version row in version table 122 (e.g., this reference can be effected by setting the value of foreign key 148 to equal the value of primary key 126 in the appropriate version row).

Audit row 144 also includes columns for several effectiveness attributes 150, including temporal attributes that identify the time period in which that associated version is effective. For example, effectiveness attributes 150 can include attributes that define a beginning effective date and an ending effective date.

Audit row 144 also includes audit attributes 152 which can include temporal attributes indicating when an associated version was created or modified. For example, audit attributes 152 can include an activation date (e.g., representing when the associated version was created), an activation user identifier (e.g., identifying the user who created the associated version), a deactivation date (e.g., representing whether the information identified by the associated version was subsequently modified, thus triggering creation of a new version), and a deactivation user identifier (e.g., identifying the user who triggered creation of a newer version).

Just as there can be multiple version rows associated with a single identity row, there can also be multiple audit rows associated with a single version row. For example, if a user changes the effectiveness period for the information, without otherwise modifying any version attributes 130 of the information stored in version table 122, this change can be effected by simply adding one or more new rows to the audit table. In other words, a given audit record 144 describes a single usage of a version record 124 in the two-dimensional timespace of effectiveness time and audit time for a given identity record 104. A given version record 124 may appear at multiple points in the timespace, each of which is described by an audit record 144.

One type of information that can be stored in the data pattern of FIG. 1A is profile information, which can in turn be referenced by reference information. The profile information can store metadata for a particular type of reference entity, which may be used to control creation of records storing reference information for that type of entity. The versioned attributes that can be included in the profile information can include information identifying attributes required to be included in a particular type of reference record, information identifying attribute constraints, information identifying a particular centralized calendar (described below) to be used with the reference record, and the like.

Yet another type of information that can be stored in the data pattern of FIG. 1A is type information. Type information can include versioned attributes that identify a profile record, a conflict resolution strategy, and the like that provides context for a particular type of reference entity.

Membership and/or relationship information, which can each define a many-to-many relationship, can also be stored in the data pattern of FIG. 1A. Membership information can be used to group records corresponding to individuals through references to each individual's record. Versioned attributes of membership information can include attributes such as rank.

There are many different techniques that can be implemented using the data pattern of FIG. 1A. One-to-many relationships can be established by storing parent-child relationship information in the data pattern of FIG. 1A. In particular, the identity row of a child record can include a foreign key reference to the identity record representing the parent entity.

In some embodiments, extension records can be added to the data pattern of FIG. 1A. In one situation, extension records can be stored in an additional extension table, whose rows can be referenced by columns within a version row of the record being extended. This additional table allows new version attributes to be added to the record, without modifying the existing version table. The rows in the additional extension table can be described by the same audit information associated with the version row within the referencing record, such that each of the referencing record's audit rows can reference both a version row and a row in the additional extension table.

In other situations, it may be desirable to provide extension records that include some sort of context. For example, it may be desirable to introduce a class of new attributes to an existing record. In this situation, the new attributes can be stored in their own data pattern (e.g., having identity, version, and audit tables), and the new attributes themselves can be stored as columns in the extension record's version table. The identity table of the extension data pattern can include columns that identity the record as being an extension record (i.e., to indicate that such a record is effectively part of the record that is being extended). The identity table of the extension data pattern also includes a foreign key that references the primary key of the record being extended.

Hierarchy information can also be stored in the data pattern of FIG. 1A. Hierarchy information can include versioned attributes that identify the nodes in the hierarchy and the parent/child relationships between those nodes. In one embodiment, the version row of a hierarchy record can include columns for each level of the hierarchy, and the values of those hierarchy level columns can reference independent hierarchy level records. The hierarchy level records can then include versioned attributes describing a respective level of the hierarchy. Similarly, a hierarchy record or hierarchy level record can reference a hierarchy node record that stores versioned attributes describing a respective node within the hierarchy.

Figure 1B:
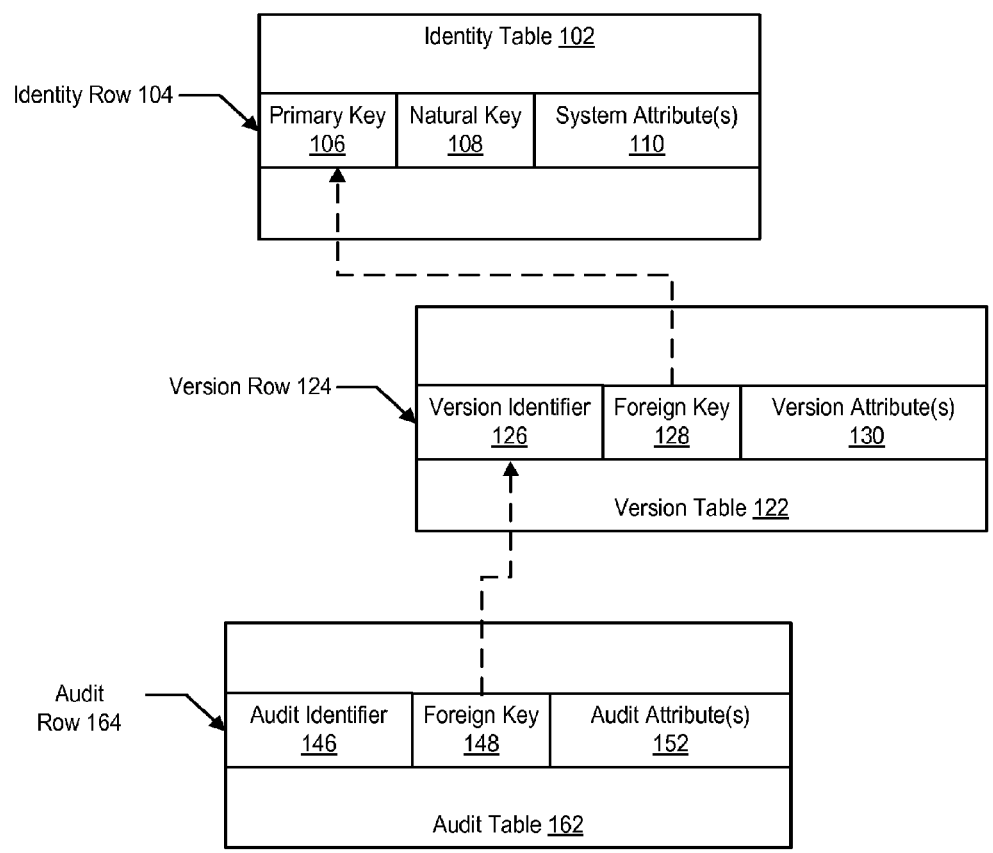
FIG. 1B is a block diagram of a set of tables organized according to an alternative data pattern for storing information, according to one embodiment of the present invention.

FIG. 1B illustrates another data pattern usable to store information. Like the data pattern of FIG. 1A, the data pattern of FIG. 1B stores information (e.g., reference information, repository information, or transactional information) and associated metadata. In one embodiment, both types of data patterns are used in the same system (e.g., the data pattern of FIG. 1A can store certain types of reference information, while the data pattern of FIG. 1B is used to store transactional information, repository information, and certain other types of reference information).

Like the data pattern of FIG. 1A, the data pattern of FIG. 1B includes a set of three tables (such tables can also be referred to as databases): an identity table 102, a version table 122, and an audit table 162. Identity table 102 and version table 122 are very similar to the similarly-numbered tables shown in FIG. 1A. In contrast, audit table 162 of FIG. 1B differs from audit table 142 of FIG. 1A in that audit table 162 does not include any effectiveness attributes. Thus, an audit row 164 in audit table 162 includes audit identifier 146, which is a single column primary key (also referred to herein as a surrogate primary key) that uniquely identifies an audit row 164 within audit table 162. Each audit row 164 also includes a foreign key 148, which references a version row in version table 122 (e.g., this reference can be effected by setting the value of foreign key 148 to equal the value of primary key 126 in the appropriate version row), and audit attributes 152. Since the data pattern of FIG. 1B does not include effectiveness attributes, this data pattern is suited for storing information such as transactional information, which does not have effective dates because the transactional information describes an event.

As an example of how reference information can be stored in the data pattern of FIG. 1A, consider a situation in which a user (e.g., a program, salesperson, or human administrator) creates a new customer record (as used in this context, a record includes a row in the identity table as well as one or more related rows in the version and audit tables) for a customer named Mary Smith. Initially, the user interacts with some sort of interface (e.g., an application programming interface (API), command line interface (CLI), graphical user interface (GUI), or the like) and provides input (e.g., by entering text, selecting an option with a mouse or other tool, or the like) indicating that the user would like to create a new customer record.

In some situations, the user may also specify one or more attributes along with the request to create a new customer record; in other situations, some attributes may be specified at a later time (e.g., if the customer is using a menu-based or wizard system). In this example, the user-specified attributes include the customer's first and last name.

In response to the user's request to create a new customer record, a data pattern module (e.g., a software routine or process) creates a new row in a customer identity table. A unique primary key "ABC123" is associated with the new identity row (for simplicity, the only column shown in this identity row is the primary key column):

| Primary Key |
| --- |
| ABC123 |

The data pattern module then creates a new row in the version table and causes the foreign key in this new version row to reference the newly created identity row. This new version row has an associated unique primary key "1". The data pattern module also adds two version attributes "first name" and "last name" to the new version row, and sets the values of these version attributes to "Mary" and "Smith" respectively. Accordingly, the version table contains the following information (for simplicity, the only columns shown in this version row are the primary key, foreign key, and two version attribute columns):

| Primary Key | Foreign Key | First Name | Last Name |
|---|---|---|---|
| 1 | ABC123 | Mary | Smith |

The data pattern module then creates a new row in the audit table having a foreign key that references the newly created version row. This new audit row has a unique primary key "A". The data pattern module also adds a beginning effectiveness date attribute, an activation date attribute, and an activation user attribute to the new audit row. The beginning effectiveness date attribute identifies the date when the new record becomes effective and the activation date attribute identifies the time at which the new record was created. In the illustrated embodiments, both happen to be represented by the same timestamp; however the activation date attribute has a higher resolution (e.g., including a calendar date and time in minutes and seconds) than the resolution (e.g., including merely a calendar date) of the beginning effectiveness date attribute. The activation user attribute (not shown) identifies the user that initiated the request. Accordingly, the audit table contains the following information (for simplicity, the only columns shown in the audit row are the primary key, foreign key, two effectiveness attributes, and two audit attributes):

| Primary Key | Foreign Key | Beginning Effectiveness Date | Ending Effectiveness Date | Activation Date | Deactivation Date |
|---|---|---|---|---|---|
| A | 1 | Jan. 1, 2008 | End of time | Jan. 1, 2008 @ 9:55 AM | End of time |

The data pattern module can also set an ending effectiveness date attribute and a deactivation date attribute in the new audit row. Since the user did not specify this information and no such information can be inferred from the user's actions (i.e., the user is not deactivating this version with the current request), these attributes have a default value that indicates the end of time (e.g., a special value, such as null, or predetermined date set far in the future, such as "9/9/9999").

At some time in the future, Mary Smith plans to change her name (e.g., in response to a change in marital status). This change is set to occur at the end of the present year but is identified several months earlier. In order to continue to be able to accurately identify the customer, a user can send a request to update the customer's record to the data pattern module (e.g., using one of the interfaces described above) on or around the date that the upcoming change is identified. The request can include the primary key of the identity row associated with the customer. The request can also include the new last name, "Henrack" for the customer as well as the date at which the name change will become effective (alternatively, this attribute information can be provided subsequent to the request).

In response to this request, the data pattern module creates a second row in the version table. This second version row includes the same foreign key and first name attribute as the first version row, but has a different primary key ("2") and last name attribute ("Henrack" instead of "Smith").

| Primary Key | Foreign Key | First Name | Last Name |
|---|---|---|---|
| 1 | ABC123 | Mary | Smith |
| 2 | ABC123 | Mary | Henrack |

The data pattern module also modifies the first audit row described above to include a deactivation date, which is set equal to the date on which the user requested the name change. This renders the first audit row inactive. The data pattern module can also set the value of the deactivation user identifier in the first audit row (not shown) to identify the user that initiated this new request to change the customer's last name.

In order to provide a non-destructive data pattern, the data pattern module does not modify any of the effectiveness information in the first audit row. In order to indicate when the prior version (in the first version row) became ineffective, the data pattern module also creates a second audit row, which references the first version row (i.e., the row that identifies the version of the customer named Mary Smith). This second audit row has an activation date equal to the date on which the user requested the change, and an ending effectiveness date specifying the end of the current year (i.e., the date on which the customer will stop being called Mary Smith). Other attributes in the second audit row, such as the beginning effectiveness date, can be the same as that in the first audit row.

The data pattern module additionally creates a third audit row, which references the second version row (i.e., the row that identifies the version of the customer named Mary Henrack). The beginning effectiveness date attribute of the third audit row identifies the beginning of the next year (i.e., the date on which the customer will begin being called Mary Henrack). In contrast, the activation date attribute of the third audit row has the same value as the activation date attribute of the second audit row, which specifies the date on which both rows were created.

After these changes are implemented, the audit table contains three rows corresponding to the customer:

| Primary Key | Foreign Key | Beginning Effectiveness Date | Ending Effectiveness Date | Activation Date | Deactivation Date |
|---|---|---|---|---|---|
| A | 1 | Jan. 1, 2008 | End of time | Jan. 1, 2008 @ 9:55 AM | Aug. 24, 2008 @ 9:51 PM |
| B | 1 | Jan. 1, 2008 | Dec. 31, 2008 | Aug. 24, 2008 @ 9:51 PM | End of time |
| C | 2 | Jan. 1, 2009 | End of time | Aug. 24, 2008 @ 9:51 PM | End of time |

It is noted that the data pattern module can update and create rows in any order. For example, the data pattern module can create the second and third audit rows prior to modifying the first audit row, such that the first audit row remains active until after the second and third audit rows have been created and populated with attribute information.

The day after the customer information is updated to reflect the upcoming name change, the user discovers that the customer's new last name was misspelled and should actually be "Henrick." To reflect this change, the user requests another update of the customer's reference information.

In response to the user's request, the data pattern module creates a third row in the version table. Like the first and second version rows, the third version row references the primary key of the identity row associated with the customer. Furthermore, this third version row also has the same first name attribute value ("Mary"). The third version row has a different last name attribute value ("Henrick") however.

| Primary Key | Foreign Key | First Name | Last Name |
|---|---|---|---|
| 1 | ABC123 | Mary | Smith |
| 2 | ABC123 | Mary | Henrack |
| 3 | ABC123 | Mary | Henrick |

The data pattern module also modifies the third audit row (this is the audit row that indicated when the second version row became effective) to include a deactivation date value equal to the date on which the user requested the correction. The data pattern module can also update a deactivation user attribute (not shown) to identify the user that requested the correction.

The data pattern module then creates a fourth audit row that references the newly-created third version row (i.e., the row identifying "Mary Henrick"). This fourth audit row has the same beginning effectiveness date as the third audit row and a default ending effectiveness date and deactivation date. Since this fourth audit row has the same effectiveness period as the third audit row, an additional audit row is not needed (i.e., only one audit row needs to be created to store this change, while two audit rows were used for the name change above). The activation date of the fourth audit row is the date the user requested the correction.

| Primary Key | Foreign Key | Beginning Effectiveness Date | Ending Effectiveness Date | Activation Date | Deactivation Date |
|---|---|---|---|---|---|
| A | 1 | Jan. 1, 2008 | End of time | Jan. 1, 2008 @ 9:55 AM | Aug. 24, 2008 @ 9:51 PM |
| B | 1 | Jan. 1, 2008 | 12/31/2008 | Aug. 24, 2008 @ 9:51 PM | End of time |
| C | 2 | Jan. 1, 2009 | End of time | Aug. 24, 2008 @ 9:51 PM | Aug. 25, 2008 @ 8:01 AM |
| D | 3 | Jan. 1, 2009 | End of time | Aug. 25, 2008 @ 8:01 AM | End of time |

In the above example, user-supplied reference information stored in the data pattern is never modified. Instead, new rows are created to store new user-supplied reference information. The only reference information that is modified is the deactivation date in the audit table. This reflects the non-destructive nature of the data pattern, which stores information clearly identifying all versions of the reference information that ever existed (even if those versions never became effective) as well as identifying each time that the reference information was modified and who initiated the modification.

As the above example shows, in some embodiments, the only information that is ever modified within the data pattern is the audit information, such as the deactivation date and user initiating the deactivation. Thus, all other information, including effectiveness information, is preserved from the time of its creation.

As noted above, reference information, like that describing the customer above, is information that is referenced by transactional information describing a transaction. When Mary places an order, transactional information describes the order and contains a reference (e.g., the transactional information can include a customer column storing a foreign key that has a value equal to the primary key "ABC123" for Mary's row in the data pattern's identity table) to the identity information in the data pattern describing Mary. Because the transactional information references the identity table, which is never purged, the link from the transactional information to the reference information will never be destroyed, even if Mary's reference information is later modified. Similarly, by simply using references to the identity row associated with Mary each time Mary places an order, the transactional information describing the order will always refer to the version of Mary's reference information that is active and effective at the time the order is placed.

Furthermore, the effectiveness and audit information in Mary's reference information allow the transactional information to always obtain the correct version of the reference information. For example, if information (e.g., an invoice) pertaining to an order needs to be recreated after the order was placed, and a new version of the reference information is active when the information is being recreated, the information in the version table can be used to obtain the appropriate version of the reference information that was in place at the time the order was placed. Specifically, assume Mary placed an order on Oct 12, 2008, and the invoice associated with that order needs to be recreated on Jan 7, 2009. The transaction (i.e., Mary's order) is described by transactional information that has a transaction date identifying the date on which that transaction occurred (Oct 12, 2008). The transactional information can also include audit information, including a creation date, which identifies when that transactional information was created, and a last modified timestamp, which identifies the most recent time at which the transactional information describing Mary's order was modified. Using the transaction date and the appropriate transactional audit information, the audit table can be searched for the row (e.g., Row B) that identifies a version that was in effect on the transaction date (Oct 12, 2008) and that was active on the particular audit date (e.g., as indicated by the creation date in the transactional information) for which the information is desired. The information in the version row (e.g., Row 1) identified by the identified audit row can then be used to recreate the invoice. Accordingly, any preexisting version of reference information can be recreated, based on an transaction date for the transaction, which is used to query the effectiveness information in the audit table, and an audit date for the transaction, which is used to query the audit information in the audit table.

Note that in certain other situations, it may be desirable to use the current date and/or time (as opposed to transaction-specific information) to query both the effectiveness and audit information of the data pattern. For example, if it is desirable to use the current version of the reference information when generating information (e.g., such as a product recall notice) for a transaction, the appropriate version can be found by simply using the current date to query the audit information and the effectiveness information. If it is desirable to send all customers who ordered a particular product a notice regarding that product's recall status on Feb. 2, 2009 (which is also the current date in this example), and if Mary ordered that product in October of 2008, the Feb. 2, 2009 date can be used to search for the audit row (e.g., Row D) associated with Mary that identifies a version that is both effective and active on Feb. 2, 2009. The identified audit row can be used to identify the version row (e.g., Row C) that stores the version of Mary's reference information that is effective and active on Feb. 2, 2008. This version of Mary's reference information can then be used to contact Mary regarding the recall.

Figure 2:
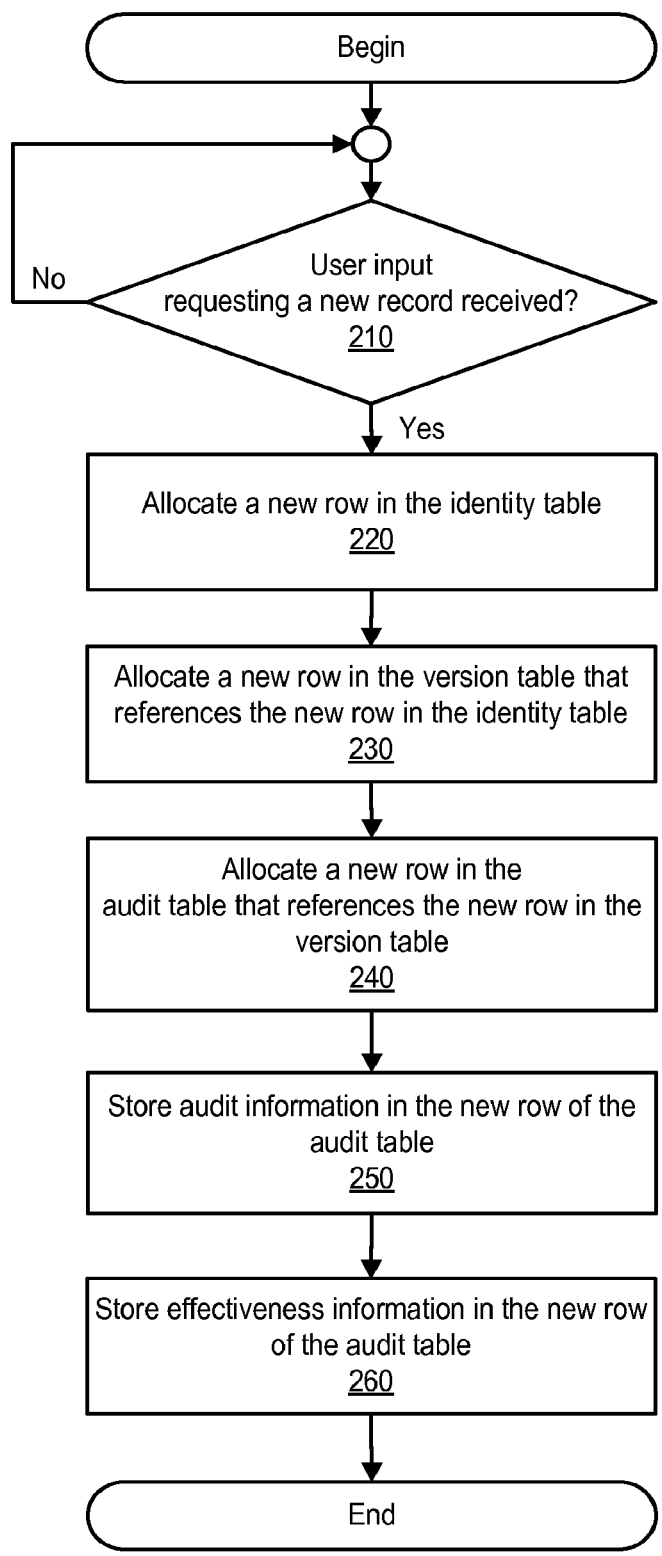
FIG. 2 is a flowchart of a method of populating a data pattern with information describing a particular instance of an entity, according to one embodiment of the present invention.

FIG. 2 is a flowchart of a method of populating a data pattern with information describing a particular instance of an entity (e.g., a transaction or a reference entity). The method begins at 210, when user input (e.g., received from an administrator or application) is received requesting a new record for a new entity. In response to receiving this user input, a new row is allocated in the identity table for the type of entity being created, as shown at 220. This new identity row includes a primary key identifying the new entity. This primary key can be returned to the user that requested the new record, such that the user can subsequently use the primary key to access the record.

A new row in the version table for that type of entity is also allocated, as shown at 230. This new version row references the new identity row allocated at 220. If any versioned attributes describing the initial version of the new entity are received (e.g., as part of the request or subsequent to the request), the values of these versioned attributes can be stored in the new version row.

A new row is also allocated, as shown at 240, in the audit table for the type of entity being created. This new audit row references the new version row created at 230. Audit information identifying the time of the record's creation (e.g., an activation date) is stored in the new audit row, as shown at 250. Other audit information, such as the identity of the user that requested the creation of the new record at 210, can also be stored in the new audit row. The audit information is not supplied by the user; instead, it is generated by the software allocating the new row (e.g., dates can be obtained from a centralized clock or timer that generates timestamps).

Similarly, in embodiments in which the data pattern stores effectiveness information, effectiveness information (e.g., an initial effectiveness date) identifying the effectiveness of the associated version (i.e., the version identified by the new version row referenced by the new audit row) is also stored in the new audit row, as shown at 260. This effectiveness information indicates the time period during which the associated version is effective. For example, if the entity for which the record is being created is a product and the version of the entity identified in the new version row includes special sale pricing, the effectiveness information can indicate the starting and ending date of the sale. Similarly, if the entity is a contract employee, the effectiveness information can indicate the beginning and ending dates of that employee's contract employment.

Some of the information in the new audit row may have a default value when the new audit row is allocated. For example, the ending effectiveness date and the deactivation date for the record can each initially have a default value specifying the end of time. If user input specifying a value for one or both of these dates is received when the record is created, however, that information can be stored instead of the default information.

Furthermore, in some embodiments, a centralized calendar (e.g., maintained as a set of rules or policies) can be used to control the effectiveness information that is provided by the user. For example, a company may use one or more centralized calendars to specify that new versions of certain types of reference information (e.g., such as that describing new products) can only become effective at certain times (e.g., at the beginning of a new quarter). Different effectiveness constraints can be specified for different types of records (e.g., some can be controlled by a payroll calendar, while others are controlled by a fiscal calendar). Accordingly, if a user inputs a beginning or ending effectiveness date, that date can be verified against the calendar in order to determine whether the dates are allowable beginning and/or ending effectiveness dates for the type of record being modified. If the user-specified beginning or ending effectiveness date is not allowable, the user can be prompted to enter a new date (and optionally given information identifying allowable dates). Alternatively, a default date (e.g., the next allowable date) can simply be substituted for the user-specified date.

Figure 3:
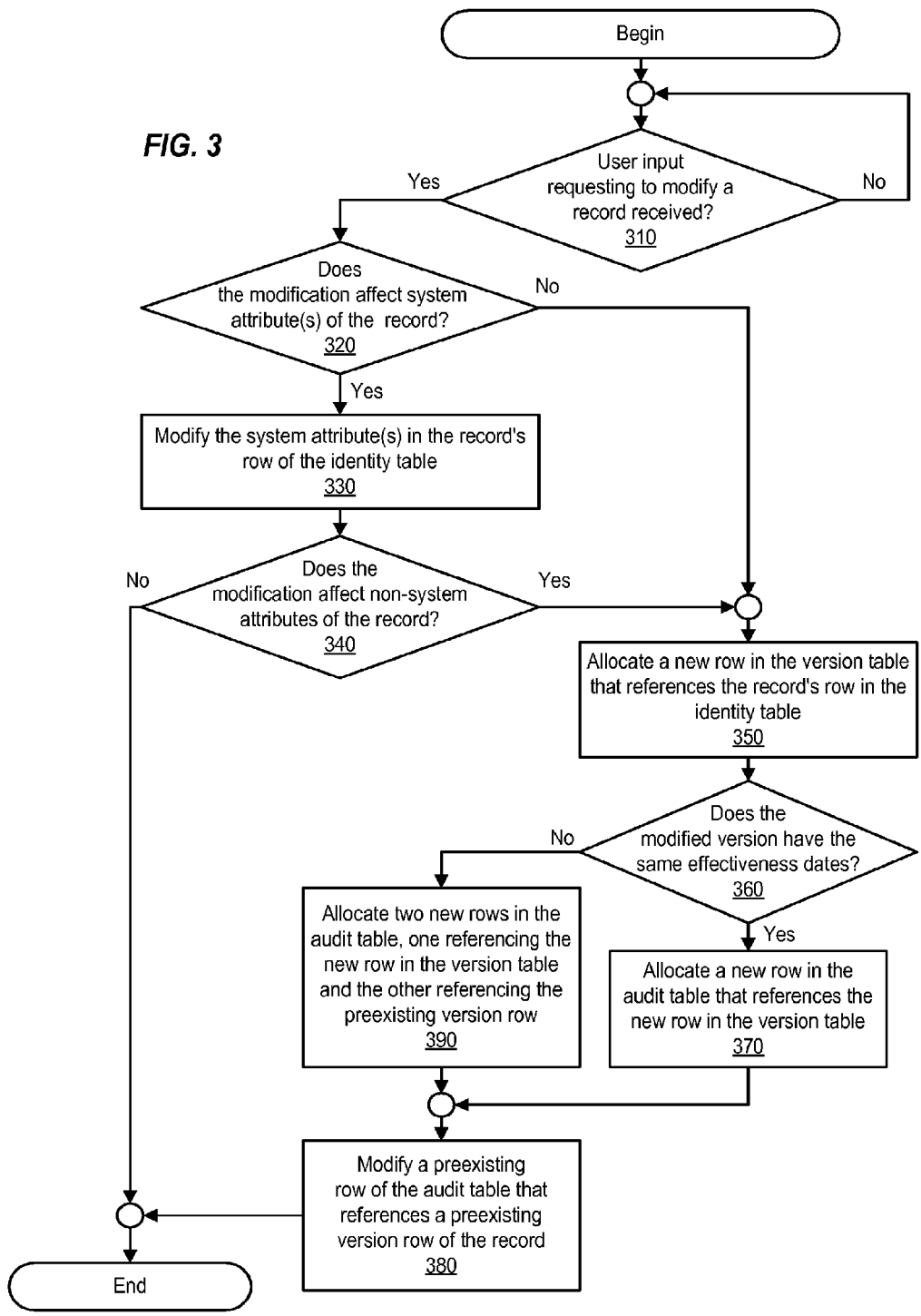
FIG. 3 is a flowchart of a method of modifying information stored in the data pattern described above, according to one embodiment of the present invention.

FIG. 3 is a flowchart of a method of modifying information stored in the data pattern described above. This method can be invoked whenever a user requests modification of a record for which a row in the identity table has already been allocated. For example, if a user seeks to modify the ending employment date for a particular person (for whom a row in the identity table has already been allocated), this method can be used to update the data pattern to store the new ending employment date. Modifications include modifications to existing attributes, deletion of existing attributes and/or the entire record, addition of new attributes, and the like.

The method begins at 310, when user input requesting to modify a record is received. The user input can include a command (e.g., such as write, delete, or the like) used to modify attributes within records, as well as information (e.g., the primary key associated with the record's identity row) identifying the record. The user input can also include information (e.g., column headers) identifying the attribute(s) to be modified within the record (e.g., "ending employment date" in the above example).

The user input can optionally include the effectiveness dates to be included in the effectiveness information associated with the new version of the record (in embodiments that maintain such information). If no effectiveness dates are provided, the user can be prompted to enter such dates or default value (e.g., the current date for the beginning effectiveness date, and the end of time for the ending effectiveness date) can be used. As noted above, such effectiveness dates can be verified against a centralized calendar.

In response to this user input, a determination can be made as to whether the modification affects any system attributes of the reference record, as shown at 320. If so, the system attributes in the identity row allocated to the reference record can be modified, as shown at 330. As noted above, system attributes can be stored in the identity row of the reference record, and thus modification of system attributes does not require the allocation of new version or audit rows.

If the modification instead (or additionally) affects attributes of the record other than system attributes, as detected at 340, a new row in the version table, which references the identity row allocated to the record in the identity table, is allocated for the record, as shown at 350. This new row in the version table stores the current value of the versioned attributes of the record, including those values that resulted from the modification requested at 310.

Additionally, one or more new rows in the audit table are allocated. In particular, if the modified version has the same effectiveness dates as the previous version, a single new row is allocated in the version table, as shown at 360 and 370. This new audit row references the new row in the version table that was allocated at 350. The new audit row can include information identifying the effectivity of the version described by the values in the new version row, as well as information identifying when the modification occurred (e.g., as an activation date identifying the time at which the new version became active) and/or any other desired audit or effectivity information (e.g., such as the identity of the user that requested the modification).

If instead the effectiveness dates of the new version (stored in the version row allocated at 350) differ from those of the prior version, two new rows are allocated in the audit table, as shown at 360 and 390. The first new audit row references the prior version and the second new audit row references the new version row allocated at 350. The first audit row has the same beginning effective date as the audit row that references the prior version and an ending effective date equal to the beginning effective date of the new version. The second audit row has the beginning effective date specified for the new version. Thus, the ending effective date of the first new audit row is the same as the beginning effective date of the second new audit row.

In addition to inserting one or more new audit rows, a preexisting row of the audit table, which references a preexisting (prior to allocation of the new row at 350) row of the version table, is also modified, as indicated at 380. The preexisting row of the audit table is the row that previously identified the current version, prior to creation of a new version at 350. The preexisting row can be identified by searching the audit table for a row that identifies an active and effective version of the reference record, prior to creation of the new version. This preexisting row can then be modified to indicate that the preexisting version is no longer active by modifying the deactivation date to specify the time at which the modification requested at 310 occurred. This deactivation time can be the same as the activation time of the new audit row created at 360.

In some situations (e.g., such as those that arise when a user makes a modification that is retroactive, such that the beginning effective date of the modified version is earlier than the current date), several preexisting rows may need to be modified as part of operation 360. Additionally, more than two new audit rows may need to be inserted as part of operation 390 in certain situations.

It is noted that, no matter how many attributes are affected by the requested modification, the number of I/O operations needed to perform the requested modification will remain relatively stable. Thus, if the request changes a large number of versioned attributes, the request can be satisfied by simply changing all of the appropriate columns in the newly allocated version row. A few (e.g., two or three) audit rows contain the audit and effectiveness information for all of these changes, and thus extra I/O operations are not needed to capture audit and/or effectiveness information for each individual change. In one embodiment, the number of I/O operations is constant. If the effectiveness information for the new version is the same as that for the prior version, three rows are modified (one is a new version row allocated to contain the updated version attributes, another is a new audit row, and the other is the preexisting audit row); otherwise, four rows are modified (the three mentioned above, plus a fourth new audit row).

Figure 4:
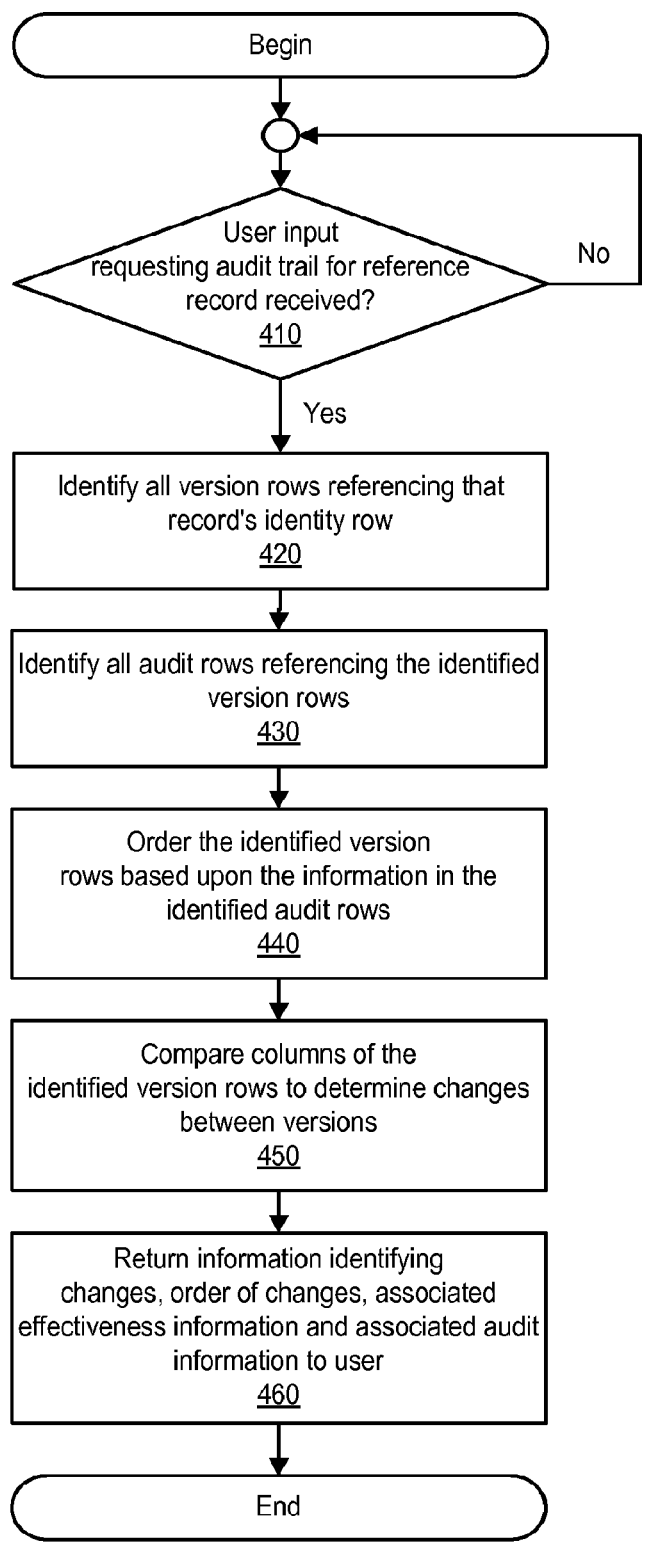
FIG. 4 is a flowchart of a method of creating an audit trail for a particular entity, according to one embodiment of the present invention.

FIG. 4 is a flowchart of a method of creating an audit trail for a particular entity. An audit trail is a listing of all changes that occurred to the data pattern within a particular time period. Thus, for each version attribute column and/or for each effectiveness attribute column that was modified during the time period, the audit trail identifies the surrogate primary key of the version and/or audit table in which the column is included, old and new value of that column, as well as a timestamp identifying when that column was modified. If a column was modified multiple times during the time period, the audit trail will include multiple sets of information for that column. The audit information can also include information such as which user initiated the modification.

The method begins at 410, when user input requesting creation of an audit trail for a particular record is received. The user input can include, for example, a command associated with audit trail creation as well as information (e.g., the primary key associated with the record's row in the identity table) identifying the record.

In response to the request for an audit trail, all of the version rows that are part of the record are identified, as indicated at 420. Operation 420 can be performed by searching the version table for all rows that reference the record's identity row (i.e., all version rows having foreign keys that have the same value as the primary key of the record's identity row).

All of the audit rows referencing the identified (at 420) version rows can then be identified, as shown at 430. Operation 430 can be performed, for example, by searching for all audit rows having foreign keys that have the same value as one of the version identifiers used by the identified version rows.

At 440, the audit information (e.g., activation and/or deactivation dates) and/or effectiveness information, if any, in the identified (at 430) audit rows is used to order the identified (at 420) version rows. For example, the version rows can be ordered based upon the activation dates contained in their associated audit rows. Thus, if a first version row was activated prior to a second version row, as determined based upon the audit information in the audit rows associated with the first and second version rows, the first version row can be ordered prior to the second version row.

In one embodiment, ordering is performed in two phases. The first phase uses the beginning effectiveness date. For effectiveness records that have the same beginning effectiveness date, only the first one (based on activation date) should be used in the comparison. Starting with the oldest beginning effectiveness date in the identified effectiveness records, a comparison is made by querying the audit information for an activation date that is the same as the beginning effectiveness date. The beginning effectiveness date in the audit row identified in the comparison is then used to make the next comparison. In the second phase, any ignored effectiveness records (i.e., those having the same effectiveness date as another audit record and whose beginning effectiveness dates were not used in the comparison) are used to build a branched comparison trail. This technique can be used to identify retroactive modifications or modifications made to an entity having pre-existing future versions (i.e., versions that are already stored in the version table but not yet effective, as indicated by the effectiveness information associated with those versions).

The columns of the identified version rows can then be compared to determine what changes occurred between versions, as indicated at 450. In other words, for a given column that stores values of a particular version attribute (e.g., such as a first or last name), the value of that column in each of two rows can be compared to determine whether that particular version attribute changed between versions. In the above example describing the customer reference record, for example, changes to the customer's last name would be detected between versions (e.g., the value of the column storing the last name attribute was changed from "Smith" to "Henrack" between versions 1 and 2, and then from "Henrack" to "Henrick" between versions 2 and 3). If the value of a particular column differs between two consecutively ordered version rows, a change is identified.

At 460, information identifying the changes identified at 450, as well as the order of those changes, is returned to the user that requested the audit trail. The returned information can be returned by storing the returned information into an audit table, which includes a row for each attribute that has been modified (if an attribute has been modified multiple times, a separate row is included for each modification). The returned information can also include other audit information, as well as effectiveness information, if any, obtained from the identified audit rows. For example, for each identified change, the returned information can include information identifying the user that requested that change as well as the time at which that change occurred and/or was requested. For the customer reference record example provided above, the returned audit trail could include information indicating that the last name was changed from Smith to Henrack in response to a request received on Aug. 24, 2008 and that the last name was changed from Henrack to Henrack in response to a request received on Aug. 25, 2008. In one embodiment, the audit information includes the following attributes, all of which can be returned as part of an audit trail: activation date, activation user, activation source, activation method, activation reason, activation service run/batch run/job, deactivation date, deactivation user, deactivation source, deactivation method, deactivation reason, deactivation service run/batch run/job.

The method of FIG. 4 is performed in response to a user request for an audit trail, and uses audit information that was stored in the reference record prior to the receipt of the request for the audit trail. This method thus differs from many conventional systems which only begin recording audit information when an audit has been requested (e.g., through activation of an audit trail function). In conventional systems, audit tables are populated in real time, such that performance of any modification to a record will involve updating the audit tables if the audit trail function has been activated. This can significantly impact performance, since an additional row must be inserted into the audit table for each attribute being modified by a particular operation.

In contrast, the use of the data pattern described herein allows audit information to be captured on the fly, in a manner that only requires one to two new audit rows to be added in response to a particular operation, regardless of the number of attributes being modified by that operation. This audit information in the data pattern can then be used to generate audit tables on demand, using the method of FIG. 4. Additionally, the data pattern described herein stores entire versions, such that an appropriate record can be identified for any given audit date and effective date. In contrast, conventional audit trail models require extensive computation to determine the exact state of an entity at a particular time. For example, in conventional systems, this computation is necessary to reconstruct a record by starting from a given version and then applying changes made from that point onwards.

Figure 5:
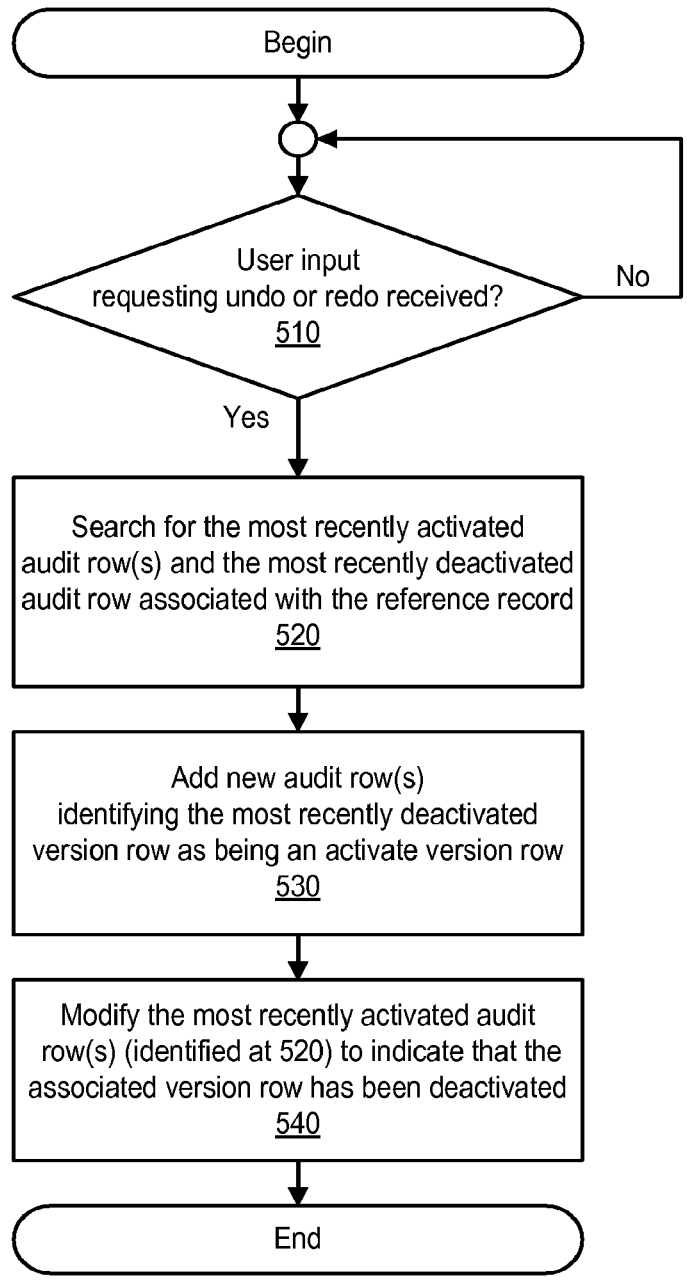
FIG. 5 is a flowchart of a method of performing undo and redo operations on information, according to one embodiment of the present invention.

FIG. 5 is a flowchart of a method of performing undo and redo operations on information stored in a data pattern. The method begins at 510, when user input requesting an undo or redo operation is received. The user input can include information (e.g., the primary key of the record's identity row) identifying the record as well as information identifying the desired undo or redo operation.

Prior to performing the undo or redo operation, certain conditions can be evaluated (not shown) to determine whether it is possible to undo or redo anything. For example, if an undo operation is requested, a determination can be made as to whether any modifications have been made to the specified record in the current session. If no modifications have been made, information indicating that there is nothing to undo can be returned to the user. Similarly, if no undo operations have been performed in the current session and the user requests a redo operation, information indicating that there is nothing to redo can be returned to the user.

At 520, the audit table is searched for an audit row (or rows) in the record that was most recently activated (e.g., audit row(s) storing the most recent activation date). These audit row(s) identify the most recently activated version row(s), which are the version row(s) that store the version(s) that the user wants to remove via the undo or redo command. It is noted that multiple recently activated versions may exist, each of which may have a different effectiveness period.

The audit table is also searched for the audit row(s) in the record that were most recently deactivated (e.g., the audit row(s) storing the most recent deactivation date). These audit row(s) identify the most recently deactivated version row(s), which store the version that the user wants to reactivate via the undo or redo command.

At 530, a new audit row(s) is/are allocated. The new audit row(s) includes the same effectiveness information as the most recently deactivated audit row(s). The deactivation date in the new audit row(s) is set to a value (e.g., "end of time") that indicates that the associated version is active. This reactivates the most recently deactivated version row(s), thus undoing a previous command (or redoing a previously undone command). The activation date of the new audit row(s) indicates the time at which the undo or redo operation was requested.

At 540, the process is completed by modifying the most recently activated audit row(s) to indicate that the associated version row(s) have been deactivated (e.g., by setting the deactivation date of the most recently activated audit row(s) to identify the time at which the undo or redo operation was requested).

It is noted that if multiple undo and/or redo operations of the same type (i.e., multiple undo operations or multiple redo operations) are performed in succession, with no intervening non-undo and non-redo user-initiated modifications, the number of and results of previous undo and/or redo operations can be tracked in memory in order to support multiple levels of undo and redo. For example, if a user requests two undo operations in succession, the user presumably wants to undo two successive modifications, not to undo the effects of the previously requested undo operation. Accordingly, when the second undo operation is received, the method of FIG. 5 can be repeated, except in operation 520, instead of identifying the most recently deactivated audit row(s), the second most recently deactivated audit row(s) are identified. The second most recently deactivated audit row(s) are the most recently deactivated audit row(s), prior to the time at which the audit row(s) identified as most recently deactivated in the prior iteration of the method was deactivated.

Undo and redo operations can thus be performed by simply manipulating the audit table. No changes are made to the version table when performing these operations. The effect of the undo command is to activate an older version of the reference record and deactivate a newer version, such that the older version becomes the current version and the newer version is no longer the current version. If a redo command is subsequently received, the effect of the redo command is to activate the newer version again, such that the newer version is again the current version and the older version is again deactivated.

Figure 6:
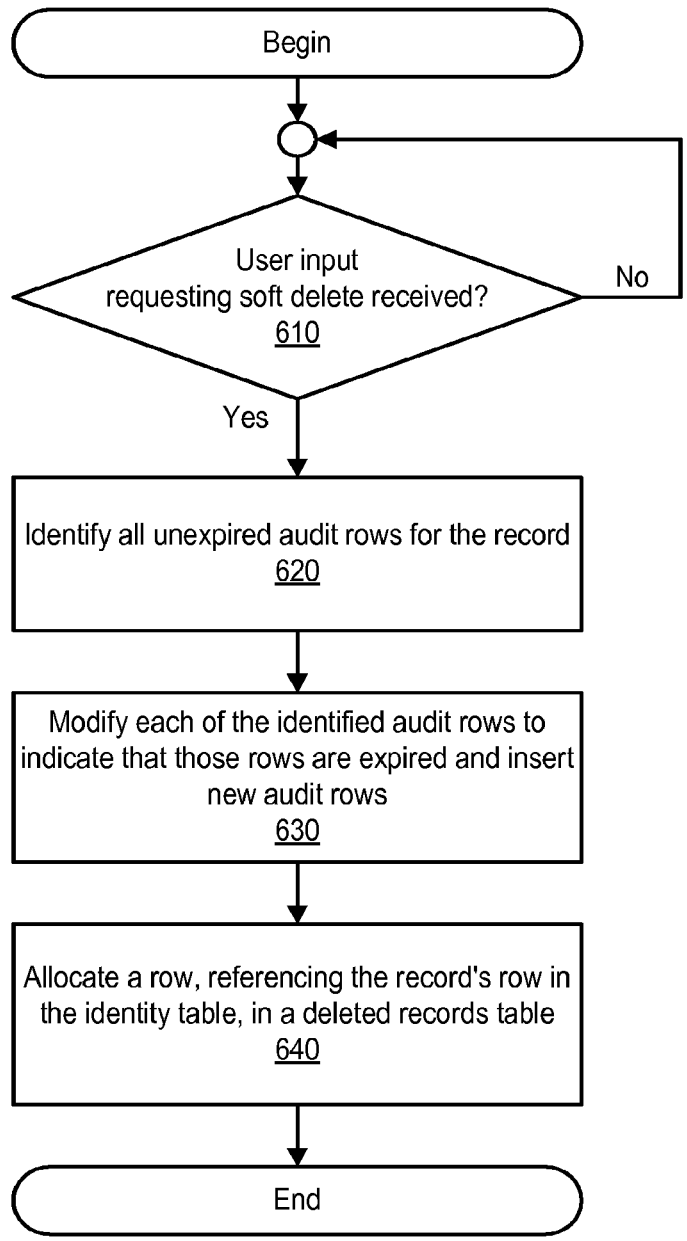
FIG. 6 is a flowchart of a method of performing soft deletes of information, according to one embodiment of the present invention.

FIG. 6 is a flowchart of a method of performing soft deletes of information. In general, "soft deletes" remove information from normal usage, while still retaining the "deleted" information. As an example, the Windows™ operating system provides a soft delete function. A Windows™ user can select a file for deletion, and the operating system will perform a soft delete such that the selected file is removed from its original location (e.g., within a particular directory) and moved into the "recycle bin." The "deleted" file is thus still available within the operating system after the soft deletion is performed.

The method begins at 610 when user input requesting a soft delete is received. The user input can include information (e.g., the primary key of the reference record's identity row) identifying the reference record to be deleted and a delete command.

At 620, all audit rows that are still in effect (referred to as "unexpired" audit rows) are identified. Identifying the unexpired audit rows can involve searching the audit table for audit rows in the reference record that have ending effectiveness date values that identify a future date. In some embodiments, only audit rows that are both still in effect and currently active (e.g., due to having deactivation dates in the future) are identified.

In some embodiments, additional checks may be made before proceeding. For example, if the audit rows indicate that there is a future version (e.g., because one or more versions have beginning effectiveness dates in the future) or gap in time between current versions and future versions, the user can be provided with a warning indicating that there are future versions that have not yet gone into effect that will be deleted. The user can be prompted to confirm or cancel the soft delete operation.

At 630, each of the identified audit rows is modified to indicate that the row is now inactive (e.g., by changing the deactivation date in each row to indicate the time at which the delete was requested). One or more new audit rows are also inserted (e.g., as described above with respect to FIG. 3, where the number of audit rows to insert depends upon when the new audit row will have the same beginning effective date as the modified audit row) to indicate that the identified version row(s) are now ineffective as of the deletion date. This effectively renders all of the respective version rows for the record ineffective. As a result, if a user tries to retrieve the current version of the record, no current version will be found, since no version is currently effective any more. At the same time, because no version information is modified or deleted, it is possible to recover the record if the user later decides to undelete the record.

In order to better facilitate undeletions, a deleted records table can be maintained. This deleted records table can identify records for which soft delete operations have been performed. At 640, a row in the deleted records table is allocated, and information identifying the record for which the soft delete operations 620 and 630 were performed is stored in the newly allocated row. The information identifying the record can include the primary key of the record's row in the identity table and the activation date of the deletion. The deleted records table provides a list of soft-deleted records, allowing, for example, a recycle bin feature to be implemented. It is noted that operation 640 is optional and may not be performed in embodiments that do not maintain a deleted records table.

Figure 7:
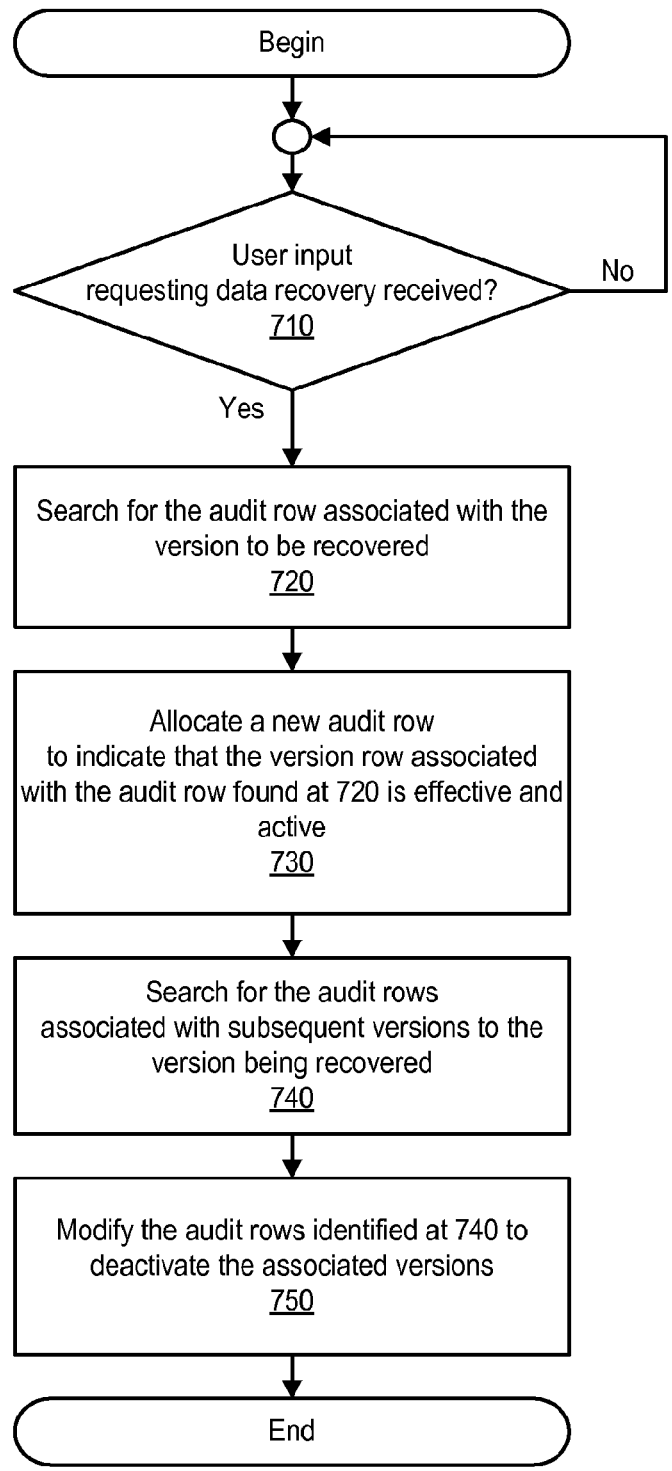
FIG. 7 is a flowchart of a method of performing data recovery of information, according to one embodiment of the present invention.

FIG. 7 is a flowchart of a method of performing data recovery of information stored in a data pattern. The method begins at 710, when user input requesting data recovery is received. The user input can specify a data recovery command, as well as information (e.g., a primary key identifying a row in the identity table) identifying the particular record to be recovered. The user input can also specify the version of the record that should be recovered (e.g., by specifying a prior time to which the record should be recovered, indicating that the version to recover is the version that was active and in effect at that prior time).

At 720, the audit table is searched for the audit row associated with the version to be recovered. For example, if the user input specifies a prior time, the audit table can be searched for an audit row that was both active and effective at that prior time. This audit row identifies the version row that stores the version to be recovered.

At 730, a new audit row, which references the version row identified by the audit row found at 720, is allocated. The new audit row indicates that the version row identified by the audit row found at 720 is active and effective. For example, the new audit row can have a deactivation date and an ending effectiveness date equal to the end of time.

At 740, the audit table is searched for all audit rows associated with subsequent versions (relative to the version stored in the version row identified by the audit row found at 720) of the reference record. For example, if the user input specified a prior time, the audit table can be searched for all audit rows that were activated subsequent to that prior time. In some embodiments, only audit rows that are still active are identified. The current version can be included in the subsequent versions, if the current version was activated subsequent to the version being recovered.

The audit row(s) identified at 740 are then modified to indicate that their associated version row(s) are no longer active, as indicated at 750. This operation can be performed by modifying the deactivation date for each of the audit row(s) identified at 740 to indicate the time at which the data recovery was requested.

The data recovery technique illustrated in FIG. 7 can be used to restore a version that was created in a session other than the current session. Thus, the user input at 710 can be received in the current user session and can specify a version that was created in a previous user session.

The data recovery method of FIG. 7 can also be applied to multiple records at the same time. In such a situation, instead of searching for only audit rows that correspond to a particular record, all audit rows (which can correspond to multiple different records) are searched, and audit rows for different records can be identified as candidates for recovery. Thus, instead of specifying a particular record, the user input at 710 can specify other information (e.g., such as a batch identifier, which could be stored as audit information in all audit rows created in response to execution of the batch process identified by that batch identifier) can be provided as part of the user input requesting the data recovery, as well as a prior time to which the records should be recovered. This information can then be used to search for appropriate audit rows to reactivate and deactivate.

Figure 8:
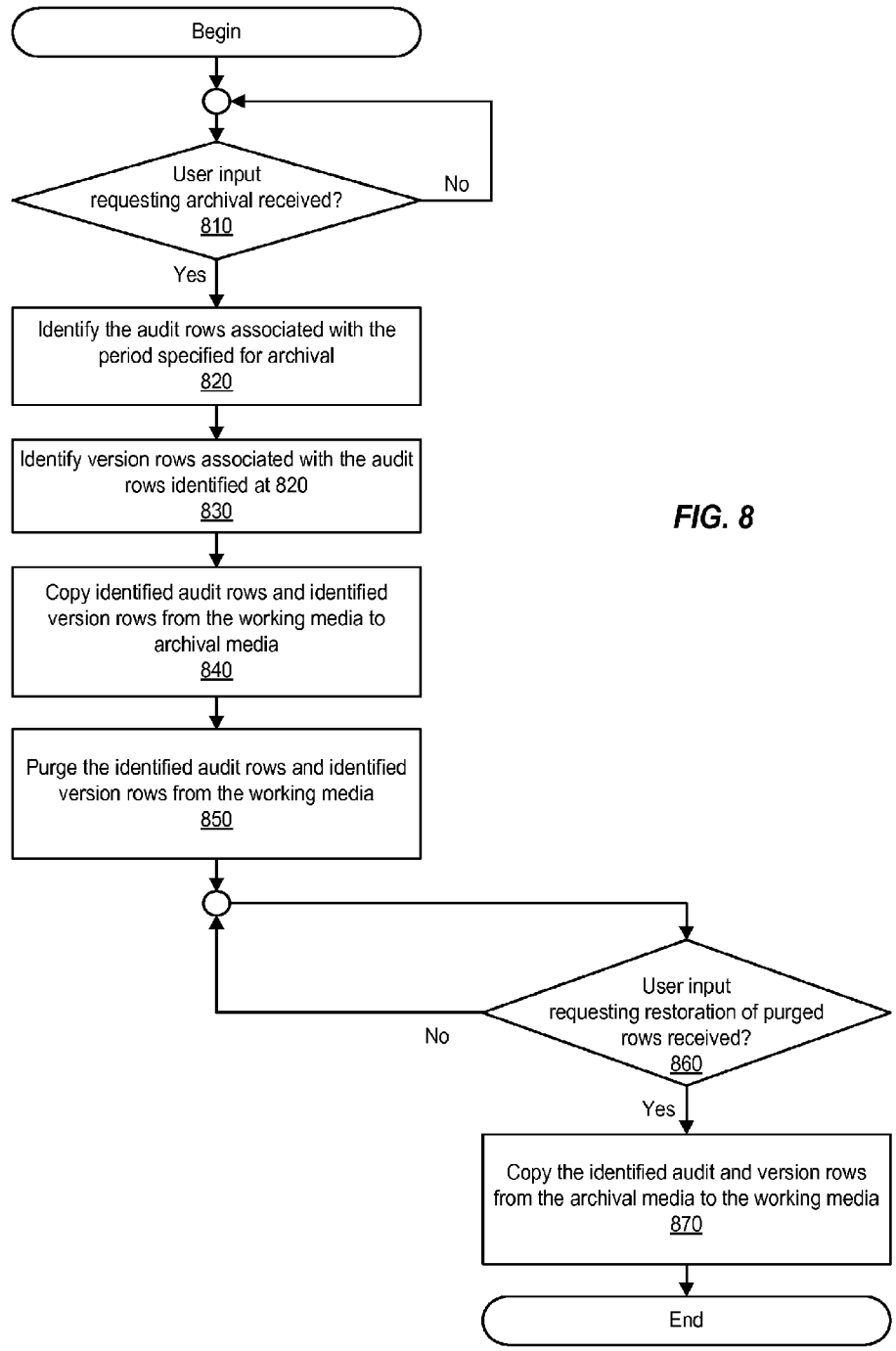
FIG. 8 is a flowchart of a method of archiving, purging, and restoring information, according to one embodiment of the present invention.

FIG. 8 is a flowchart of a method of archiving, purging, and restoring information stored in a data pattern. The method begins at 810, when user input requesting archival of one or more records is received. The user input can specify a time period in terms of an ending period effectiveness date and/or a period deactivation date. The specified time period can be used to determine which effectiveness and version rows to archive and/or purge. In general, it is more efficient to perform archival and restores for multiple records, and thus the user input may not specify particular records. Accordingly, the following operations can be performed on effectiveness and version rows that correspond to different records.

In some embodiments in which the user specifies the archival period, the method can also involve verifying that the period is allowable for archive by comparing the period's beginning and/or ending dates against a centralized calendar. For example, the centralized calendar can specify allowable beginning and/or ending dates, as well as acceptable lengths of archival periods. If the period is not allowable for archive, the user can be prompted to resubmit an acceptable archival period.

The database that implements the data pattern can be stored on what is referred to as working media. This working media is the storage media (e.g., a disk array) that is accessed each time a user requests to manipulate or otherwise access the information in the data pattern. In order to reduce the storage and/or performance requirements of the working media, as well as the performance requirements of the database itself, portions of records can be archived. Archival involves copying data from the working media to an archival media (e.g., a tape drive, backup storage array, or the like) and then removing that data from the database and deleting all or some of the archived data from the working media.

In response to user input, a substantial portion of one or more records is archived. In particular, all of the record except for the record's identity row can be archived and, if desired, purged from the working copy of the database. By maintaining the identity rows, any existing transactional data that references the record will still have a functional reference, using the primary key associated with the appropriate identity row, to the record. Based on this reference to the identity row, the associated version and audit rows can be retrieved from the archive if needed.

In some embodiments, all existing effectiveness and version rows are archived in response to receipt of user input requesting archival. In other embodiments, only selected rows of the effectiveness and version tables are archived, based upon the period specified in the user input. FIG. 8 illustrates the latter embodiments. In the former embodiments, all audit and version rows associated with the specified records, regardless of period, can be copied from the working media to the archival media.

At 820, the audit rows associated with the period specified for archival are identified. In one embodiment, this involves searching the audit table for audit rows having an ending effectiveness date that is prior to or the same as the period's end date. In another embodiment, this involves searching the audit table for rows having a deactivation date that is prior to or the same as the period's close date (eg. the physical timestamp that that the period was fiscally closed). In still other embodiments, this operation involves identifying audit rows having either an ending effectiveness date that is prior to or the same as the period's end date and a deactivation date that is prior to or the same as the period's close date. Other search criteria can be used in other embodiments.

At 830, the version rows associated with the identified audit rows are identified (e.g., based upon the foreign keys included in the identified audit rows. Then, at 840, the identified audit and version rows are copied from the working media to the archival media. At 850, the archived audit and version rows are purged by removing those rows from the working media.

Once portions of records have been archived, a user can request to restore purged portions of records (e.g., in order to create an audit trail, for example). If user input requesting restoration of the purged rows is received, as detected at 860, the audit and version rows that were archived at 840 are copied from the archival media to the working media and restored as part of the database, as shown at 870.

In some embodiments, a significant number of rows can be archived and/or purged as part of a single archival operation. Similarly, a large number of rows can be restored as part of a single restoration operation. Accordingly, in some embodiments, the archival, purging, and/or restoration operations can be parallelized, such that more than one row is being archived, purged, and/or restored at the same time. For example, if 40,000 rows are identified as candidates for archival (e.g., at 820 and 830), different subsets of the identified rows can be assigned to parallel processes (e.g., the first process can operate on the first 10,000 rows, the next process can operate on the second 10,000 rows, and so on).

In one embodiment, multiple archive sets can be created over time. Each archive set is an archive of a particular set of records, as created in response to one or more archive requests. Archive sets are identified according to the particular time at which those records were archived. When archive sets are used, restoration is performed in the reverse order in which the archive sets were created. In other words, a later-created archive set must be restored prior to the restoration of an earlier-created archive set. Thus, if Archive Set A is created on May 6, 2008 at 9:01 pm, Archive Set B is created on May 6, 2008 at 9:23 pm, and Archive Set C is created on May 7, 2008 at 10:01 pm, then during restoration, Archive Set C should be restored before Archive Set B can be restored. Similarly, Archive Set B should be restored before Archive Set A can be restored. If archive sets are restored out of order, there is a possibility that some audit and/or effectiveness information (e.g., used to generate an audit trail) may be missing and that certain functions that depend on that information may not operate correctly.

In alternative embodiments, instead of archiving records to archival media, a similar process can be used to translate records to a star schema. Thus, instead of writing information to archival media as shown at 840, the information can be translated for storage in a star schema and then written to another media (e.g., analytics media, data mart media, data warehouse media, and the like). It is noted that in embodiments that are doing translations instead of archival, operations 850, 860, and 870 can be omitted (in some situations, operation 850 may be performed after translation; however, many other situations will involve maintaining the existing information subsequent to translation).

A star schema includes central "facts" tables and ancillary "dimension" tables. The fact tables can store key information (e.g., transactional information) while the "dimension" tables store information related to that key information (e.g., such as reference information). For example, a fact table can store purchase orders, while the dimension tables store information describing the entities specified in the purchase orders (e.g., such as the product ordered, the vendor, the salesperson, the purchaser, and the like). A different dimension table can be defined for each type of entity specified in the purchase order.

The information in the three tables of the data pattern can be exported to a single star schema table by extracting relevant information from the data pattern, transforming the extracted information, and then loading the transformed information in the star schema table. The information to extract can be identified based upon audit and/or effectiveness information (e.g., a user can specify a period used to query the audit and/or effectiveness information). The extracted information can include information identifying different versions of a particular column, as well as when those versions were effective. The extracted information can also be enriched by including other information (e.g., obtained from a centralized calendar) associated with the record from which the information is being extracted.

Figure 9:
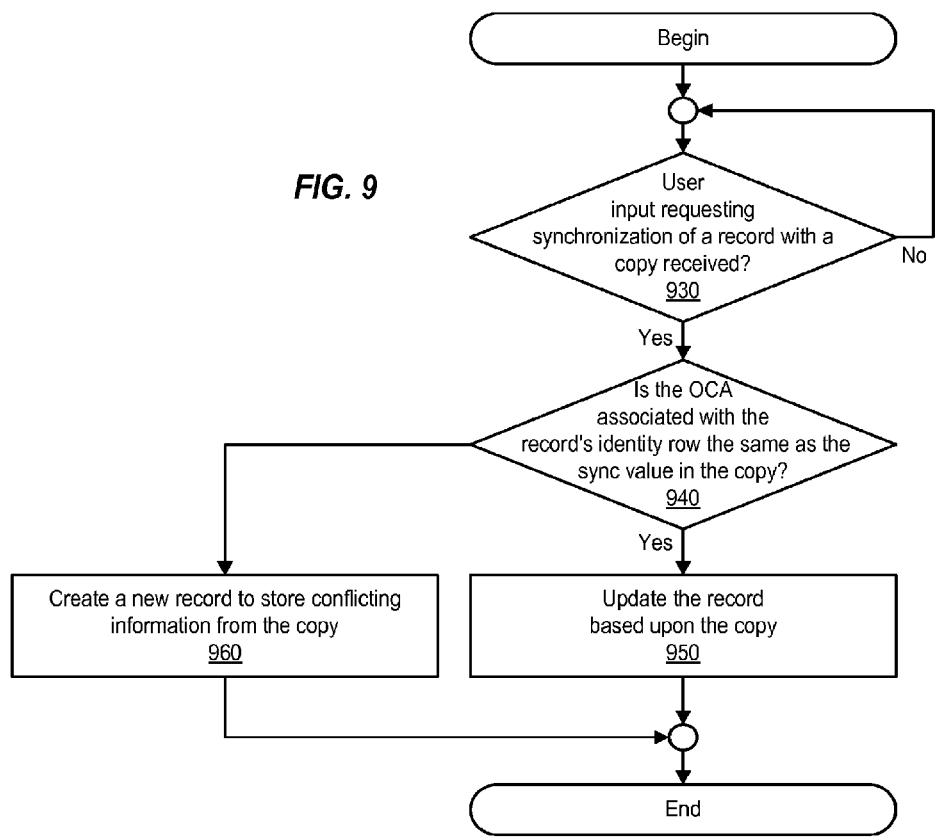
FIG. 9 is a flowchart of a method of performing synchronization functions on information, according to one embodiment of the present invention.

FIG. 9 is a flowchart of a method of performing synchronization functions on information stored in a data pattern. This method, which is based on optimistic locking, uses an optimistic control attribute (OCA), which can be maintained as one of the system attributes included in the identity information in at least some embodiments. The OCA is an attribute that is modified each time an operation (e.g., to modify a record or to perform an operation on the record) is performed on a record. In embodiments that implement an OCA, the OCA can be used to prevent collisions (e.g., such as would occur if two processes independently tried to modify the same record at the same time) to a record by providing an optimistic lock for the record. Before any user can modify the record, the user provides information identifying the record (e.g., the primary key of its row in the identity table) as well as the current value of the OCA (as known by the user) for the record. Before the user's requested modification is performed, the OCA value provided by the user is compared to the actual OCA value in the record. If the values are the same, the OCA value in the record is modified (e.g., by incrementing the OCA value or otherwise modifying the value of the OCA in a predictable manner) and the requested modification is performed. Otherwise, an error is returned to the user (since the non-matching OCA values indicate that another user has modified the record since the last time the user accessed the record).

Users may occasionally want to make local copies of records and then resynchronize those copies with the original copy of the record at a later point. For example, a salesperson may want to create a local copy of a database on her laptop for use while traveling. Upon return, the salesperson can resynchronize the local copy of the record with that stored in the database. Whenever a new copy of a record is created, the OCA in the new copy has a value equal to the current (at the time the copy is created) value of the OCA in the original copy. Additionally, this value is preserved in an additional attribute field within the copy. The additional attribute is referred to as a synchronization ("sync") value. Accordingly, while the OCA in the copy can be modified as the user performs various operations on the local copy, the synchronization value will stay the same.

The method of FIG. 9 begins at 930, when user input requesting synchronization of a record with a copy of the record is received. The user input can include information identifying the record as well as information identifying the synchronization value contained in the copy of the record.

If the original record's OCA has the same value as the synchronization value contained in the copy of the record, it indicates that the original copy of the record has not been modified since the copy was made. Accordingly, there is no conflict between the two copies and any new information in the copy of the record can be copied to the original copy, as indicated at 940 and 950.

If instead the record's OCA has a different value than the synchronization value contained in the copy of the record, it indicates that the original copy of the record has been modified since the copy was made. Accordingly, there is a conflict between the two copies. To preserve the conflicting versions of the record, a new record can be allocated in the same set of tables as the original copy. This new record has a new identity row (and thus a new primary key) and includes the audit and version rows in the copy that differ from the original copy of the reference record. In order to preserve any business rules defined by the original record's natural key (e.g., natural key 108 of FIGS. 1A and 1B), the natural key in the new record may include an additional identifier (e.g., the new identity row can include a standalone conflict identifier and/or reference to the identity row of the original record) to aid in conflict resolution.

In some embodiments, various conflict resolution techniques can then be applied to the conflicting versions in order to select one version as a survivor and the other version as a deceased party. Either the copy (now represented by the new record) or the original copy can be selected as the survivor. In such situations, a set of separate survivorship tables can be maintained in order to track the outcome of the conflict resolution and to be able to undo the effects of the conflict resolution and/or create audit trails based upon information that existed prior to the conflict resolution. The survivorship tables can include a survivorship table, which corresponds to an identity table but for survivorship records instead of normal records, a survivorship version table that stores version information for each survivorship record, and a survivorship audit table that stores effectiveness and audit information for each survivorship version row. Each survivorship record corresponds to the outcome of a conflict resolution involving a particular record.

Each row in the survivorship table can include a reference to the deceased party (i.e., the reference can be a foreign key having a value equal to the primary key associated with the identity row for either the original copy or the copy, depending upon which was selected as the deceased party during conflict resolution). Each row in the survivorship version table can include a similar reference to a surviving party, and a corresponding row in the survivorship audit table can indicate the periods during which that version row is effective and active. Thus, if a user attempts to access the deceased party (e.g., because transactional data references that copy), the survivorship tables can be used to find the current version of that party's information, which is stored in a surviving party's reference record.

Many of the operations shown in FIGS. 2-9 can be performed in a different order than is illustrated (e.g., operation 750 of FIG. 7 can be performed before operation 730 of FIG. 7). Furthermore, alternative embodiments can be implemented that include other operations instead of and/or in addition to those illustrated in FIGS. 2-9. Some alternative embodiments may also omit certain operations.

Figure 10:
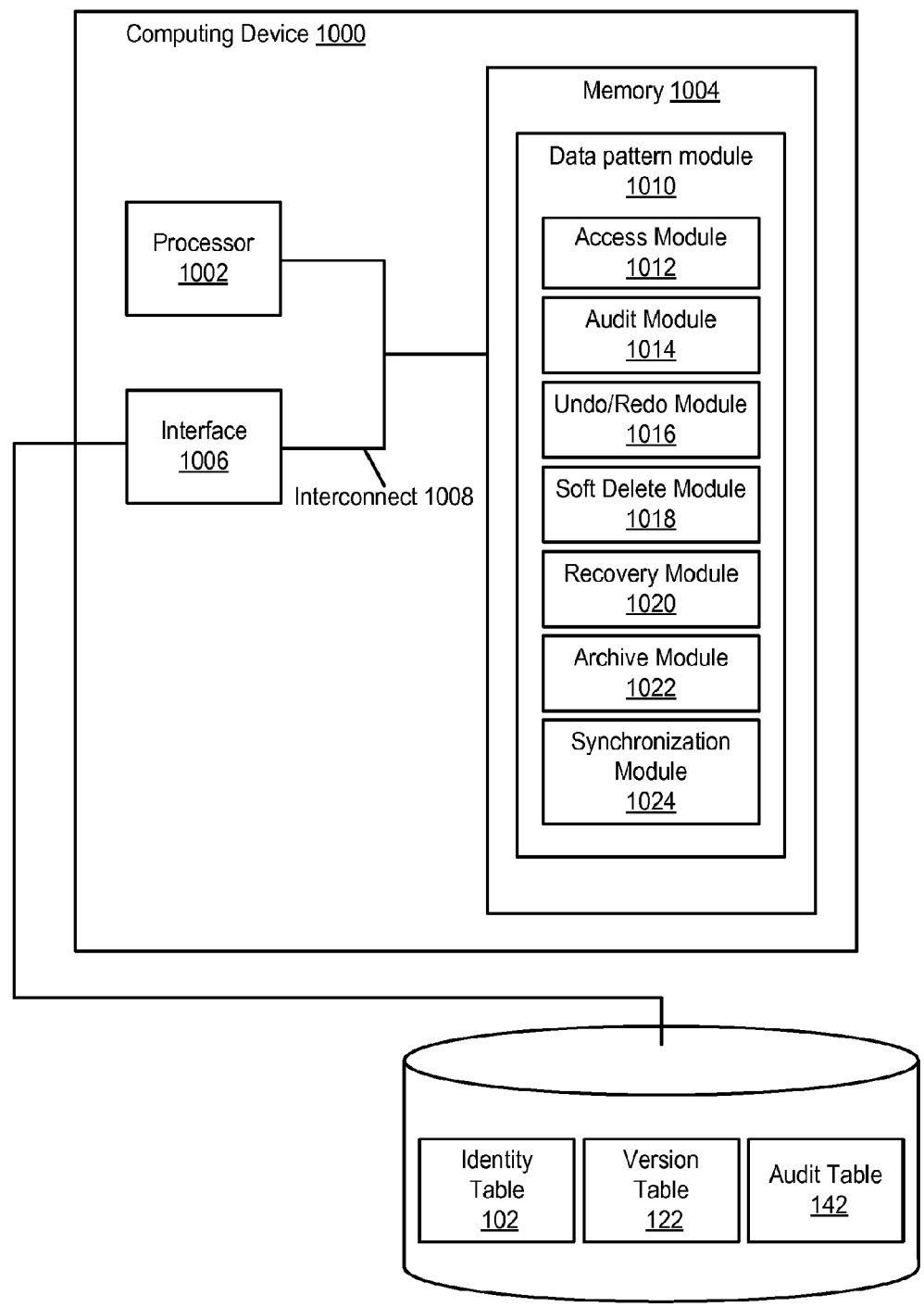
FIG. 10 is a block diagram of a computer device that illustrates how a data pattern module, which is configured to store information in data patterns such as those described above, can be implemented in software, according to one embodiment of the present invention.

FIG. 10 is a block diagram of a computer device 1000 that illustrates how a data pattern module 1010, which includes an access module 1012 configured to store information in data patterns such as those described above, can be implemented in software. Access module 1012 can be configured to perform techniques such as those described with respect to FIGS. 2-3. Data pattern module 1010 includes various modules that are configured to perform one or more of the methods illustrated in FIGS. 4-9. For example, data pattern module 1010 includes an audit module 1014 configured to perform a method like that shown in FIG. 4, an undo/redo module 1016 configured to perform a method like that shown in FIG. 5, a soft delete module 1018 configured to perform a method like that shown in FIG. 6, a recovery module 1020 configured to perform a method like that shown in FIG. 7, an archive module 1022 configured to perform a method like that shown in FIG. 8, and a synchronization module 1024 configured to perform a method like that shown in FIG. 9.

Computing device 1000 can be a personal computer, network appliance, server, personal digital assistant, mobile phone, storage controller (e.g., an array controller, tape drive controller, or hard drive controller), laptop computer, or the like. In general, computing device 1000 is configured to execute software or otherwise provide appropriate functionality to act as a component of the data management system described herein.

As illustrated, computing device 1000 includes one or more processors 1002 (e.g., microprocessors, Programmable Logic Devices (PLDs), or Application Specific Integrated Circuits (ASICs)) configured to execute program instructions stored in memory 1004. Memory 10004 can include various types of RAM (Random Access Memory), Read Only Memory (ROM), Flash memory, Micro Electro-Mechanical Systems (MEMS) memory, magnetic core memory, and the like. Memory 1004 can include both volatile and non-volatile memory. Computing device 1000 also includes one or more interfaces 1006. Processor 1002, interface 1006, and memory 1004 are coupled to send and receive data and control signals by a bus or other interconnect.

Interface 1006 can include a network interface to various networks and/or interfaces to various peripheral buses. For example, interface 1006 can include a network interface via which user input requesting various manipulations of information stored in a data pattern is received. Interface 1006 can also include an interface to one or more storage devices (e.g., such as a storage device storing the identity table 102, version table 122, and audit table 142).

In this example, program instructions and data executable to implement all or part of data pattern module 1010 are stored in memory 1004. The program instructions and data implementing data pattern module 1010 can be stored on various computer readable storage media such as memory 1004. In some embodiments, such software is stored on a computer readable storage medium such as a Compact Disc (CD), Digital Versatile Disc (DVD), hard disk, optical disk, tape device, floppy disk, and the like). In order to be executed by processor 1002, the instructions and data can be loaded into memory 1004 from the other computer readable storage medium. The instructions and/or data can also be transferred to computing device 1000 for storage in memory 1004 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a request to perform a first data management function on a set of information, wherein
the set of information describes an entity;
in response to the receiving the request to perform the first data management function, performing the request, wherein
the performing the request comprises
accessing a data pattern, wherein
the set of information is stored in the data pattern,
the performing the request modifies the data pattern, and
the performing the request does not modify any portion of the set of information;
subsequent to the accessing the data pattern, receiving a request to create an audit trail for the entity; and
in response to the receiving the request to create the audit trail, creating the audit trail, wherein
the creating the audit trail comprises accessing the data pattern.

2. The method of claim 1, wherein
the first data management function is one of
an undo command,
a redo command, or
a soft delete command.

3. The method of claim 1, wherein
the data pattern comprises
an identity table,
a version table comprising at least one reference to the identity table, and
an audit table comprising at least one reference to the version table,
the identity table stores information identifying the set of information,
the version table stores version information identifying one or more versions of the set of information, and
the audit table stores audit information identifying when each of the one or more versions of the set of information was modified.

4. The method of claim 3, wherein
the set of information is a set of reference information,
the set of reference information is referenced by transactional information, and
the audit table also stores effectiveness information identifying when each of the one or more versions of the set of information is effective.

5. The method of claim 1, wherein
the data pattern comprises an audit table storing audit information,
the accessing the data pattern comprises dynamically creating an audit trail based upon the audit information, in response to receipt of the request, and
the method further comprises
updating the audit information in response to a modification of the set of information, wherein
the updating the audit information is performed prior to receiving any request for an audit trail.

6. The method of claim 5, wherein the updating the audit information comprises:
updating at most two rows of the audit table, wherein
the modification of the set of information modifies more than two attributes of the set of information.

7. A non-transitory computer readable storage medium comprising program instructions executable to:
receive a request to perform a first data management function on a set of information, wherein
the set of information is configured to describe an entity;
perform the request in response to receipt of the request to perform the first data management function, wherein
the program instructions executable to perform the request comprise
program instructions executable to
access a data pattern,
the data pattern is configured to store the set of information,
the performance of the request modifies the data pattern, and
the performance of the request does not modify any portion of the set of information;
receive a request to create an audit trail for the entity subsequent to accessing the data pattern; and create the audit trail in response to receipt of the request to create the audit trail, wherein
the program instructions executable to create the audit trail comprise program instructions executable to access the data pattern.

8. The non-transitory computer readable storage medium of claim 7, wherein
the first data management function is one of
an undo command,
a redo command, or
a soft delete command.

9. The non-transitory computer readable storage medium of claim 7, wherein
the data pattern comprises
an identity table,
a version table comprising at least one reference to the identity table, and
an audit table comprising at least one reference to the version table,
the identity table is configured to store information identifying the set of information,
the version table is configured to store version information identifying one or more versions of the set of information, and
the audit table is configured to store audit information identifying when each of the one or more versions of the set of information was modified.

10. The non-transitory computer readable storage medium of claim 9, wherein
the set of information is a set of reference information,
the set of reference information is referenced by transactional information, and
the audit table also stores effectiveness information identifying when each of the one or more versions of the set of information is effective.

11. The non-transitory computer readable storage medium of claim 7, wherein
the data pattern comprises
an audit table configured to store audit information,
the program instructions executable to access the data pattern comprise program instructions executable to dynamically create an audit trail based upon the audit information, in response to receipt of the request, and
the program instructions are further executable to
update the audit information in response to a modification of the set of information, wherein
the program instructions further executable to update the audit information are configured to be executed prior to receipt of any request for an audit trail.

12. The non-transitory computer readable storage medium of claim 11, wherein
the program instructions further executable to update the audit information comprise program instructions executable to
update at most two rows of the audit table, wherein
the modification of the set of information modifies more than two attributes of the set of information.

13. A system comprising:
one or more processors; and
a memory storing program instructions, executable by the one or more processors and configured to
receive a request to perform a first data management function on a set of information, wherein
the set of information is configured to describe an entity,
perform the request, in response to receipt of the request to perform the first data management function, wherein
the program instructions configured to perform the request comprise program instructions configured to access a data pattern,
the set of information is stored in the data pattern,
the performance of the request modifies the data pattern, and
the performance of the request does not modify any portion of the set of information;
receive a request to create an audit trail for the entity subsequent to accessing the data pattern; and
create the audit trail in response to receipt of the request to create the audit trail, wherein
the program instructions configured to create the audit trail comprise program instructions configured to access the data pattern.

14. The system of claim 13, wherein
the first data management function is one of
an undo command,
a redo command, or
a soft delete command.

15. The system of claim 13, wherein
the data pattern comprises
an identity table,
a version table comprising at least one reference to the identity table, and
an audit table comprising at least one reference to the version table,
the identity table is configured to store information identifying the set of information,
the version table is configured to store version information identifying one or more versions of the set of information, and
the audit table is configured to store audit information identifying when each of the one or more versions of the set of information was modified.

16. The system of claim 15, wherein
the set of information is a set of reference information,
the set of reference information is referenced by transactional information, and
the audit table also stores effectiveness information identifying when each of the one or more versions of the set of information is effective.

17. The system of claim 13, wherein
the data pattern comprises
an audit table configured to store audit information,
the program instructions configured to access the data pattern comprise program instructions configured to dynamically create an audit trail based upon the audit information, in response to receipt of the request, and
the program instructions are further configured to
update the audit information in response to a modification of the set of information, wherein
the program instructions further configured to update the audit information are configured to be executed prior to receipt of any request for an audit trail.

18. The system of claim 17, wherein
the program instructions further configured to update the audit information comprise program instructions configured to
update at most two rows of the audit table, wherein
the modification of the set of information modifies more than two attributes of the set of information.

* * * * *

UNITED STATES PATENT AND TRADEMARK OFFICE
CERTIFICATE OF CORRECTION

| | | |
|---|---|---|
| PATENT NO. | : 8,782,070 B2 | Page 1 of 1 |
| APPLICATION NO. | : 13/572890 | |
| DATED | : July 15, 2014 | |
| INVENTOR(S) | : Becker et al. | |

It is certified that error appears in the above-identified patent and that said Letters Patent is hereby corrected as shown below:

In the Specification

In column 21, line 58, delete "that that" and insert -- that --, therefor.

Signed and Sealed this
Twenty-fourth Day of February, 2015

Michelle K. Lee
*Deputy Director of the United States Patent and Trademark Office*